United States Patent
Gugaliya et al.

(10) Patent No.: US 11,953,477 B2
(45) Date of Patent: Apr. 9, 2024

(54) METHOD AND CONTROL SYSTEM FOR DETECTING FAULTS ASSOCIATED WITH GAS CHROMATOGRAPH DEVICE IN PROCESS PLANT

(71) Applicant: ABB Schweiz AG, Baden (CH)

(72) Inventors: Jinendra Gugaliya, Bangalore (IN); Arun Kumar Gupta, Mumbai (IN)

(73) Assignee: ABB Schweiz AG, Baden (CH)

( * ) Notice: Subject to any disclaimer, the term of this patent is extended or adjusted under 35 U.S.C. 154(b) by 552 days.

(21) Appl. No.: 17/271,620

(22) PCT Filed: Aug. 20, 2019

(86) PCT No.: PCT/IB2019/057000
§ 371 (c)(1),
(2) Date: Feb. 26, 2021

(87) PCT Pub. No.: WO2020/044165
PCT Pub. Date: Mar. 5, 2020

(65) Prior Publication Data
US 2021/0325354 A1    Oct. 21, 2021

(30) Foreign Application Priority Data
Aug. 28, 2018 (IN) .............................. 201841032213

(51) Int. Cl.
*G01N 30/86* (2006.01)
*G05B 13/02* (2006.01)
*G01N 30/02* (2006.01)

(52) U.S. Cl.
CPC ..... *G01N 30/8624* (2013.01); *G05B 13/0265* (2013.01); *G01N 2030/025* (2013.01)

(58) Field of Classification Search
CPC ............... G01N 30/8624; G01N 30/88; G01N 2030/025
See application file for complete search history.

(56) References Cited

U.S. PATENT DOCUMENTS 5,592,402 A * 1/1997 Beebe ................ G01N 30/8641
73/23.23

FOREIGN PATENT DOCUMENTS

| JP | 2003329662 A | * 11/2003 |
| JP | 2003329662 A | 11/2003 |
| WO | 2016/061558 A1 | 4/2016 |

OTHER PUBLICATIONS

English Machine Translation of Nako (JP 2003-329662), Nov. 19, 2003 (Year: 2003).*

(Continued)

*Primary Examiner* — David Z Huang
(74) *Attorney, Agent, or Firm* — Leydig, Voit & Mayer, Ltd.

(57) ABSTRACT

The present application discloses method and sewer (111) for detecting faults associated with a gas chromatograph device (100) in a process plant. The gas chromatograph device (100) is associated with a database (110) configured to store a measured chromatogram, and historic chromatograms. Initially, the server receives the measured chromatogram from the database. Upon receiving the measured chromatogram, the server is configured to detect at least one real-time symptom for measured chromatogram. The real-time symptoms may be detected by comparing the historic chromatograms with predetermined configuration data to the measured chromatogram. Upon detecting the real-time symptoms, the server is configured to determine faults associated with the gas chromatograph device. The faults are determined by mapping the real-time symptoms and fault signature data received from the database. The fault signature data is generated using machine learning model trained by providing the faults and the historic gas chromatogram.

9 Claims, 7 Drawing Sheets

(56) References Cited

OTHER PUBLICATIONS

Indian Patent Office, First Examination Report from related IN 201841032213, dated Dec. 17, 2020, 7 pages.
European Patent Office, International Search Report for related PCT/IB2019/057000, dated Jan. 2, 2020, 4 pages.
European Patent Office, Written Opinion for related PCT/IB2019/057000, dated Jan. 2, 2020, 6 pages.

* cited by examiner

100 # METHOD AND CONTROL SYSTEM FOR DETECTING FAULTS ASSOCIATED WITH GAS CHROMATOGRAPH DEVICE IN PROCESS PLANT

CROSS-REFERENCE TO RELATED APPLICATIONS

This application is a U.S. national stage of International Application Serial No. PCT/IB2019/057000, filed Aug. 20, 2019, which claims priority to Indian Patent Application No. 201841032213, filed Aug. 28, 2018. The entire disclosures of both of the foregoing applications are incorporated herein by reference.

TECHNICAL FIELD

The present disclosure relates in general to gas chromatograph devices in a process plant. More particularly, the present disclosure relates to a method for detecting faults associated with a Gas Chromatograph (GC) device in a process plant, and a server thereof.

BACKGROUND

Process plants such as nuclear power plants, chemical plants, natural gas plants, refineries and so on include a GC device which is configured to analyse a gaseous/liquid mixture. By the analysis, composition of compounds in the gaseous mixture is measured. This measurement may be critical for certain processes due to presence of toxic gases. Also, such measurements may be required for valuation of the gaseous mixture. Ensuring accuracy of the measurement may also be critical along with the measurement. Repeatability of results in the measurements for a predefined analysis, form an industry norm in stating working condition of the GC device. The repeatability may account to biases or errors in consistency. Re-calibration in the GC device may be done to correct the biases and the errors to ensure correctness of the results. However, there may be other inconsistency or deviations from normal behaviours of the GC device which may be not detected. Also, with such inconsistency or deviations, generating confidence for the results of the measurement may be difficult. Further, the re-calibration and other checks of the GC device may be done in a scheduled manner to detect consistent deviations. However, such detection of defects or faults in the GC device may be delayed and thus the error in measurement may be propagated until such detection and correction.

SUMMARY

The present disclosure discloses a method for detecting faults associated with a GC device in a process plant. The method is performed by at least one server operationally coupled with the GC device. The GC device is further associated with at least one database configured to store at least one of a real-time gas chromatogram, and a historic gas chromatogram. The real-time gas chromatogram and the historic gas chromatogram is obtained from the GC device, by performing one or more gas chromatography of a gaseous mixture. The at least one server is configured to communicate with the at least one database to receive the real-time gas chromatogram and the historic gas chromatogram and detect the faults.

Initially, the at least one server is configured to receive the real-time gas chromatogram from the at least one database. The real-time gas chromatogram may be obtained by performing a real-time gas chromatography for the gaseous mixture in the GC device. The real-time gas chromatogram is a graph representing value of composition of each of a plurality of compounds in the gaseous mixture against retention time associated with corresponding compound in a predefined sequence.

Upon receiving the real-time gas chromatogram, the at least one server is configured to detect at least one real-time symptom for the real-time gas chromatogram. The at least one real-time symptom may be detected by comparing the graph with a predetermined configuration data relating to the real-time gas chromatography. The at least one real-time symptom indicates variation in the graph with respect to the predetermined configuration data. The predetermined configuration data indicates accurate value of composition of each of the plurality of compounds against the retention time. In an embodiment, the at least one real-time symptom is detected by, initially, detecting plurality of peaks in the graph. The plurality of peaks is compared with the predetermined configuration data to identify at least one of normal peaks from the plurality of peaks and one or more ghost peaks in the graph. Further, the at least one real-time symptom associated with peaks other than the normal peaks is determined using one or more image processing techniques.

Upon detecting the at least one symptom, the at least one server is configured to determine one or more faults from a plurality of faults associated with the GC device. The one or more faults are determined using the at least one real-time symptom and a fault signature data. The fault signature data is generated using a machine learning model trained by providing the plurality of faults and the historic gas chromatogram received from the at least one database. The historic gas chromatogram is obtained by performing one or more previous gas chromatography in the GC device. The fault signature data indicates association of each of the plurality of faults with the plurality of symptoms. In an embodiment, the fault signature data is a look-up table comprising rows and columns as the plurality of faults and the plurality of symptoms. The one or more faults may be determined by mapping the at least one real-time symptom from the plurality of symptoms in the fault signature data with the plurality of faults of the fault signature data.

Further, a confidence score is determined for each of the one or more determined faults. The confidence score indicates probability of occurrence of corresponding fault in the GC device.

BRIEF DESCRIPTION OF ACCOMPANYING DRAWINGS

DETAILED DESCRIPTION

The present disclosure discloses a method and a control system for detecting faults associated with a GC device in a process plant. The control system comprises at least one server and at least one database which is operationally coupled with the GC device. The at least one server is configured to perform method steps of the present invention, for detecting the faults in the GC device. The at least one database may be configured to store at least one of a real-time gas chromatogram, and a historic gas chromatogram of the GC device. The real-time gas chromatogram may be output of gas chromatography, performed by the GC device at real-time. The historic gas chromatogram may include one or more gas chromatograms which may be output of one or more previous gas chromatography performed by the GC device. In an embodiment, the at least one server may be configured to communicate with the at least one database, to receive the real-time gas chromatogram and the historic gas chromatogram, and detect the faults. In real-time, the real-time gas chromatogram is received and analysed to detect at least one symptom in the real-time gas chromatogram. Further, one or more faults associated with the GC device are determined based on the at least one symptom and predetermined configuration data associated with the GC device. Confidence score indicating probability of occurrence of each of the determined one or more faults may also be determined by the at least one server. By the proposed invention, accuracy of detection of faults in the GC device may be achieved. Also, the present invention proposes to perform the detection of faults in real-time, avoiding propagation of error caused due to the faults, in the GC device.

Figure 1:
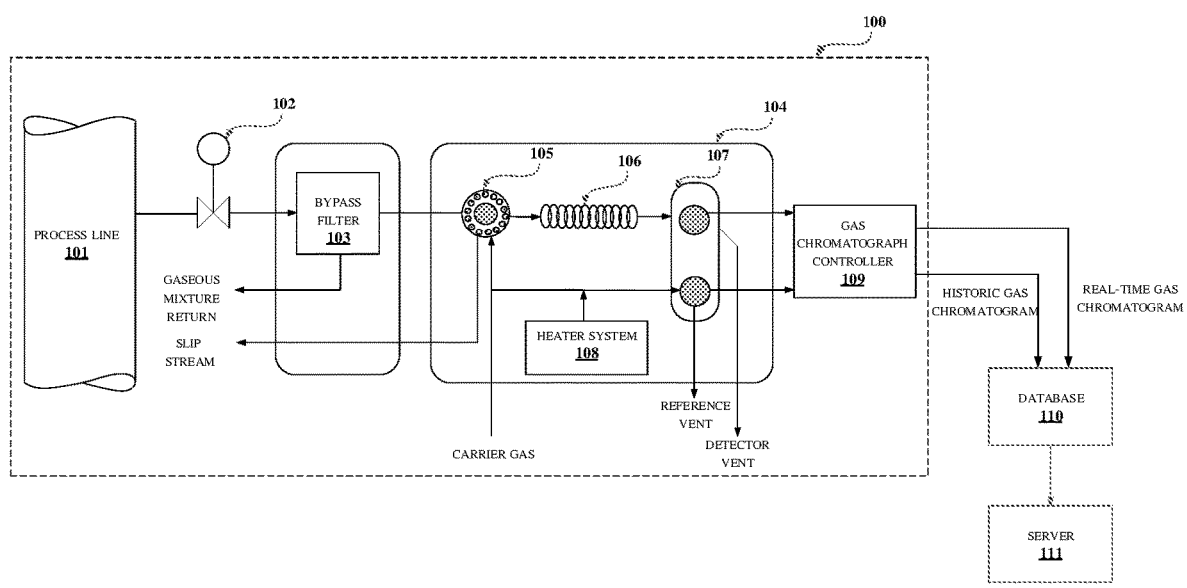
FIG. 1 illustrates a block diagram of a system including a GC device, at least one server and at least one database, for detecting faults associated with the GC device in a process plant, in accordance with an embodiment of the present disclosure.

The process plant may be a chemical plant, oil refinery, a natural gas plant and so on, which comprises plurality of equipment. At least one equipment from the plurality of equipment may operate with gaseous mixtures comprising plurality of compounds. In an embodiment, the gaseous mixture may comprise predefined concentrations (also referred to as compositions) of the each of the plurality of compounds. The GC device may be coupled with the at least one equipment which ejects the gaseous mixture. The GC device may be configured to extract the gaseous mixture from the at least one equipment to measure the composition of each of the plurality of compounds. FIG. 1 illustrates a block diagram of a plant environment including a GC device 100 and a control system for detecting faults associated with the GC device 100. The control system further includes at least one server 111 and at least one database 110. The GC device 100 may include a process line 101, a probe 102, a bypass filter 103, a GC oven 104 and a GC controller 109, along with a plurality of inlets and plurality of outlets. The GC device 100 may be configured to measure the composition of the plurality of compounds. The GC oven 104 further includes a sample valve 105, a separation column 106, a detector 107 and a heater system 108. The gaseous mixture from the at least one equipment in the process plant may be extracted via the process line 101 and the probe 102. In an embodiment, the bypass filter 103 may be configured to filter contaminants in the gaseous mixture. In an embodiment, the bypass filter 103 may be placed in a sample system of the GC device 100. The contaminants and residual gaseous mixture from the bypass filter 103 may be ejected out as gaseous mixture return, via one of the plurality of outlets in the GC device 100. Further, the gaseous mixture, upon the filtering is injected to the GC oven 104. The sample valve 105 in the GC oven 104 may be configured to combine said gaseous mixture with a carrier gas and pass said combination through the separation column 106. The carrier gas may be injected to the sample valve 105, via one of the plurality of inlets in the GC device 100. The carrier gas is used in mobile phase of the gas chromatography performed in the GC device 100. In an embodiment, the carrier gas may be injected manually by a volume injector (not shown in the figure). The carrier gas may be one of helium, nitrogen, argon, hydrogen, air and so on. In an embodiment, any carrier gas, known in the art, may be used in the present invention. Further, the gaseous mixture entering the separation column 106, interacts with coated walls of the separation column 106. Processing of the gaseous mixture inside the separation column 106 may be referred to as a stationary phase of the gas chromatography performed by the GC device 100. In an embodiment, the separation column may be associated with the heater system 108 to provision heat. The heat may facilitate volatilization of the gaseous mixture.

In an embodiment, at the stationary phase, the separation column 106 performs a chemical process causing elution of different molecules in the gaseous mixture. By this, separation of each of the plurality of compounds in the gaseous mixture may be achieved. The separation of the plurality of compounds causes ejected of the each of the plurality of compounds at different times in a predefined sequence, from the separation column 106. In an embodiment, the separation of the gaseous mixture may be achieved due to differences in partitioning behaviour between the mobile gas phase and the stationary phase in the separation column 106. In an embodiment, the separation of the plurality of compounds may be based on different strengths of interaction associated with each of the plurality of compounds in the stationary phase.

The separated gaseous mixture may be injected into the detector 107 of the GC oven 104. The detector 107 may be configured to measure the composition of each of the plurality of compounds in the gaseous mixture. The detector 107 in the GC oven 104 may be one of a thermal conductivity detector, a flame ionization detector, discharge ionization detector, pulsed ionization detector and so on. In an embodiment, one or more detectors, known in the art, which are configured to measure the composition of the plurality of compounds may be implemented as the detector in the present invention.

Figure 2:
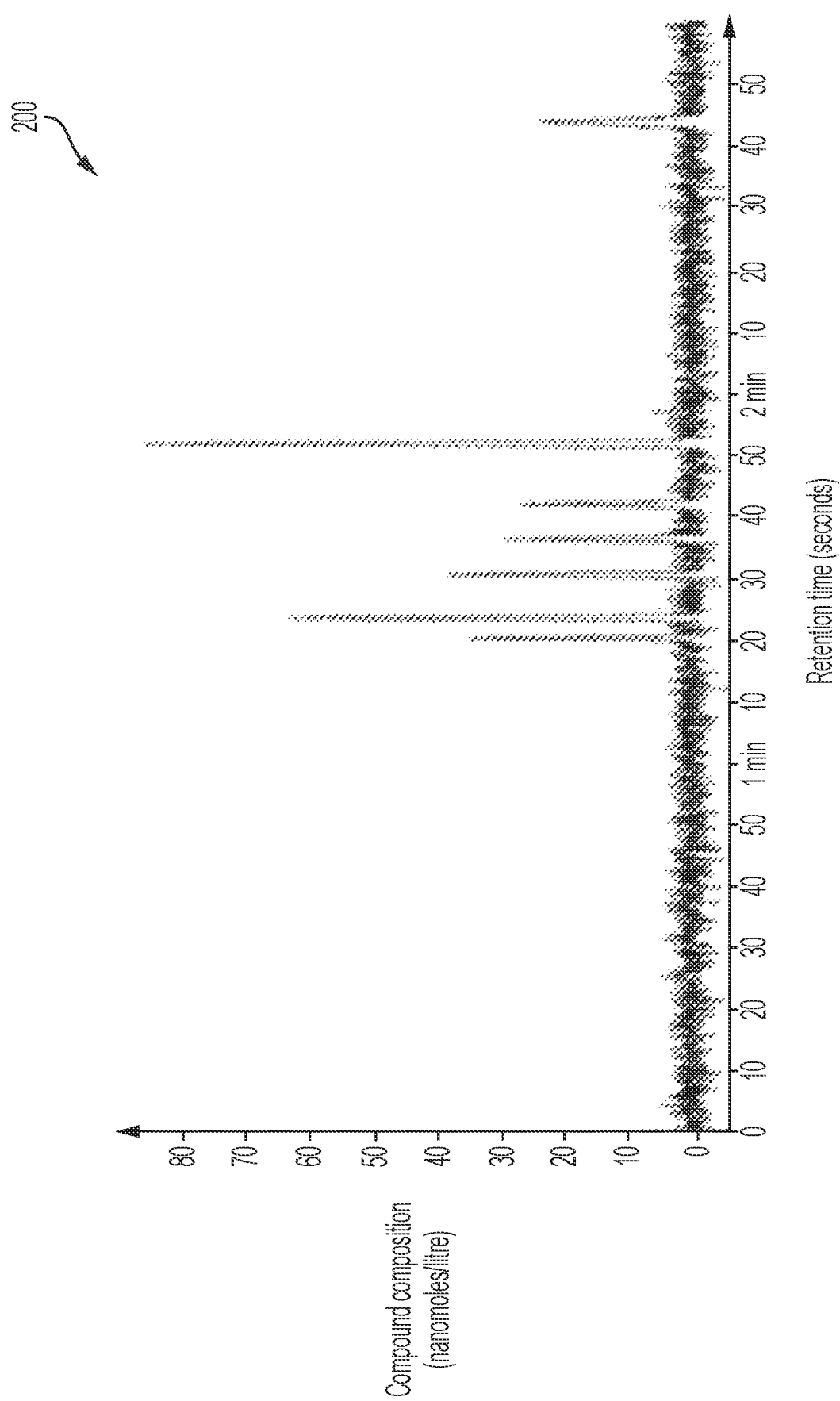
FIG. 2 shows an exemplary representation of a gas chromatogram generated by a GC device, representing composition of each of plurality of compounds in a gaseous mixture against a retention time, in accordance with an embodiment of the present disclosure.

Output of the detector 107 may be provided to the GC controller 109 which may be configured to plot the composition of each of the plurality of compounds against retention time to output a gas chromatogram. An exemplary representation of the gas chromatogram 200 is illustrated in FIG. 2. The gas chromatogram 200 may be a graph representing value of the composition of each of the plurality of compounds in the gaseous mixture. The value of the composition may be plotted against retention time of the plurality of compounds. The retention time of each of the plurality of compounds may be time duration of retention of corresponding compound in the predefined sequence. As illustrated in FIG. 2, each of plurality of peaks in the graph correspond to a compound from the plurality of compounds. In an embodiment, height of the peak indicates the value of composition of the compound.

In an embodiment of the present invention, historic gas chromatogram may be obtained by performing one or more previous gas chromatography in the GC device 100. The historic gas chromatogram associated with each of the one or more previous gas chromatography may be similar to the gas chromatogram 200 illustrated in FIG. 2. The historic gas chromatogram may be stored in the at least one database 110. In an embodiment, when performing the one or more gas chromatography, the GC device 100 may be configured to detect error and generate alarm based on the error. Result of such one or more gas chromatography may not be considered for an evaluation of the gaseous mixture. In the present invention, gas chromatogram from such one or more gas chromatography may be stored as the historic gas chromatogram in the at least one database 110.

At real-time, the GC device 100 may be configured to perform a real-time gas chromatography as described previously and generate a real-time gas chromatogram for an inputted gaseous mixture. The real-time gas chromatogram may be similar to that of the gas chromatogram 200 illustrated in FIG. 2. The real-time gas chromatogram may be stored in the at least one database 110. The at least one server 111 of the present invention may be configured to communicate with the at least one database 110 to receive the real-time gas chromatogram and the historic gas chromatogram. In an embodiment, the at least one database 110 may include first database and second database (not shown in the figure). The first database may be configured to store the historic gas chromatogram and the second database may be configured to store the real-time gas chromatogram. In an embodiment, the at least one server may communicate with the first database to receive the real-time gas chromatogram and may communicate with the second database to receive the historic gas chromatogram.

In an embodiment, the at least one server 111 may include a processor and a memory (not shown in the figure), for detecting the faults in the GC device 100. The memory may be operationally coupled with the processor. The memory may comprise modules and data, which on execution may cause the processor to perform the detection of the faults, as disclosed in the present invention. In an embodiment, the at least one database 110 may be an integral part of the at least one server 111. In an embodiment, the at least one server 111 may communicate directly with the GC device 100 to receive the real-time gas chromatogram and the historic gas chromatogram. In an embodiment, the at least one server 111 may be a cloud-based server which may be connected to the GC device 100 via any communication network known to a person skilled in the art. In an embodiment, the at least one server 111 may be a dedicated server which is embedded in the GC device 100. In an embodiment, the at least one server 111 may be configured to communicate with plurality of GC devices, to detect faults in each of the plurality of GC devices.

In the present invention, at the real-time, the at least one server 111 may be configured to receive the real-time gas chromatogram to detect at least one real-time symptom for the real-time gas chromatogram. The at least one real-time symptom may be detected by comparing the real-time gas chromatogram with a predetermined configuration data relating to the real-time gas chromatography. In an embodiment, the predetermined configuration data may indicate accurate value of composition of each of the plurality of compounds against the retention time. In an embodiment, the predetermined configuration data may also be referred to a GC configuration. In an embodiment, the predetermined configuration data may be generated based on prior knowledge on the gas chromatography performed by the GC device 100. In an embodiment, the predetermined configuration data may be generated based on existing troubleshooting knowledge relating to the GC device 100.

Figure 3A:
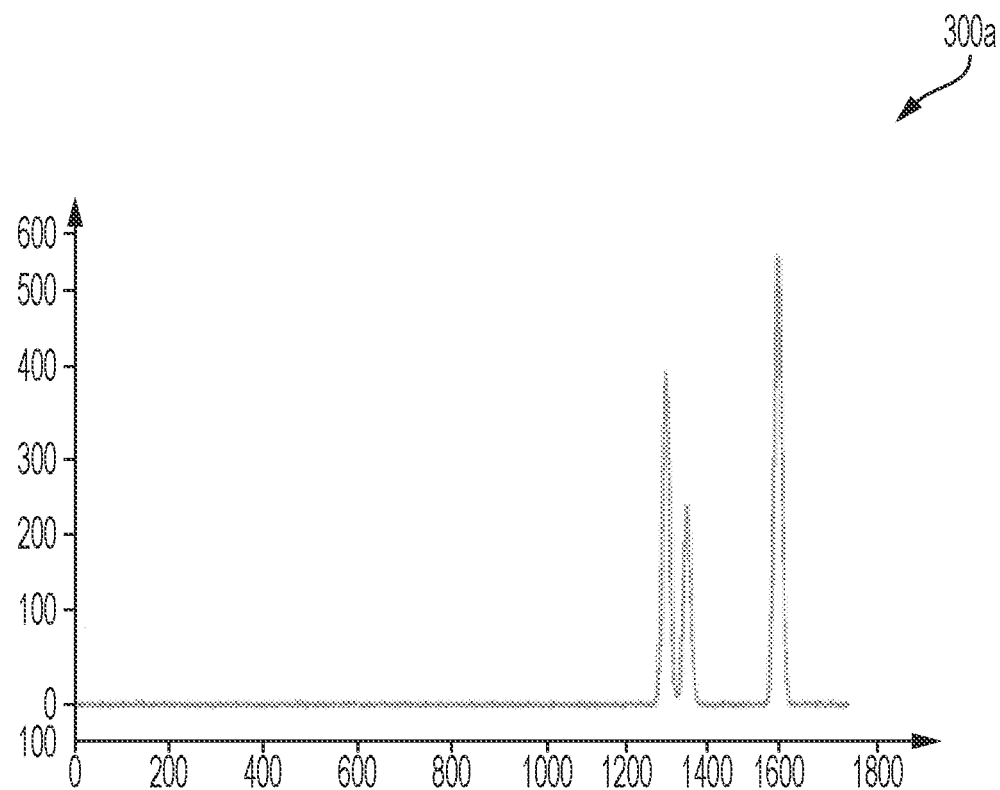
FIG. 3a shows an exemplary representation of a predetermined configuration data, for a GC device, representing accurate value of composition of each of plurality of compounds in a gaseous mixture against a retention time, in accordance with an embodiment of the present disclosure.

In an embodiment, a user, who may be operator of the GC device 100, analyser of the gas chromatogram or any person with said knowledge, may input the predetermined configuration data to the at least one server 111. In an embodiment, the predetermined configuration data may be numerical values of composition of the plurality of compounds. In an embodiment, the user may provide the predetermined configuration data in one or more forms, known in the art, to the at least one server 111. In an embodiment, the at least one server 111 may be configured to convert the numerical values of the composition to a graphical form. In an embodiment, the user may input the graphical form of the predetermined configuration data to the at least one server 111. FIG. 3a shows an exemplary representation of the predetermined configuration data 300a in the graphical form. Each of plurality of peaks in the predetermined configuration data 300a corresponds to respective compound from the plurality of compounds. In an embodiment, height of each of the plurality of peaks indicate the value of composition of the respective compound and width of each of the plurality of peaks indicate retention time associated with the respective compound in the predefined sequence.

The at least one server 111 may be configured to detect the at least one symptom by comparing the real-time gas chromatogram with the predetermined configuration data. The at least one symptom may be an abnormality or deviation or variation in the gas-chromatogram. In an embodiment, the at least one symptom may be detected using one or more techniques, known to a person skilled in the art. The at least one symptom may be due of at least one of baseline disturbances, irregularities in shape and size of the peak, occurrence of ghost peak, loss of resolution, difficulties in quantity calculation, broad solvent front and so on. The one or more ghost peaks may be additional peaks which are absent in the predetermined configuration data. In an embodiment, the one or more ghost peaks may also be referred to as phantom peaks. In an embodiment, the loss of resolution may be detected when overlap of the peaks occur in the gas chromatogram.

In an embodiment, to detect the at least one symptom, the at least one server 111 may be configured to perform peak identification in the real-time gas chromatogram. One or more techniques, known to a person skilled in the art may be implemented for detecting the plurality of peaks. One of said techniques may include to iteratively find highest point in graph of the gas chromatograph, fit a gaussian curve to the highest point, find residual from the fit to remove the peak and repeat the process. Other techniques may include, but not limited to, use zero crossings in first derivative and thresholding in data to find all peaks at once, use transitions from a steady state to transient state to find peaks, use of wavelet convolution to find local maxima and peaks, use of a pattern matching logistic classifier to find peak shaped datapoints. In an embodiment, an adaptively filter using a quadratic Savitsky-Golay moving window filter may be used for detect the plurality of peaks. The window may be of a predefined scale. In an embodiment, the predefined scale may be width of largest peak from the plurality of peaks.

Further, the plurality of peaks is compared with the predetermined configuration data to identify at least one of normal peaks from the plurality of peaks and one or more ghost peaks in the graph. This helps in identifying normal behaviours in the graph. In an embodiment, matching algorithm may be implemented for identifying at least one of the normal peaks and the one or more ghost peaks. Further, the at least one real-time symptom associated with peaks other than the normal peaks is determined. In an embodiment, median and mode of the peaks other than the normal peaks is determined to identify baseline and transition points in said peaks. This helps in further filtering of abnormal peaks. A bell shaped curves fitting is performed on the abnormal peaks to extract peak characteristics or the variation in the abnormal peaks. One or more techniques may be used for detecting the at least one symptom. The techniques may include, but not limited to, spike detection method to check for high derivatives in signals, using deviation from Gaussian curve, kurtosis, and so on in skewing index to detect most irregular peaks, noise characterization using frequency response of the signal and variation along the baseline.

Figure 3B:
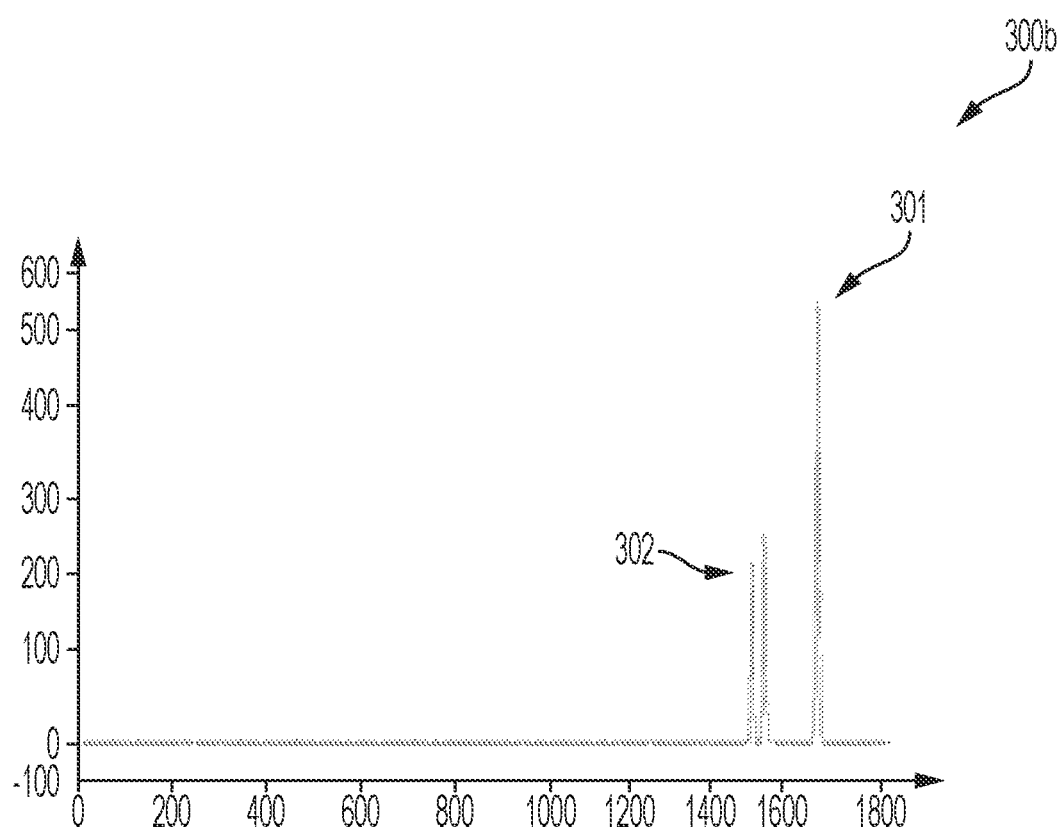
FIGS. 3b and 3c show exemplary representations of a real-time gas chromatogram from a GC device, in accordance with an embodiment of the present disclosure.
Figure 3C:
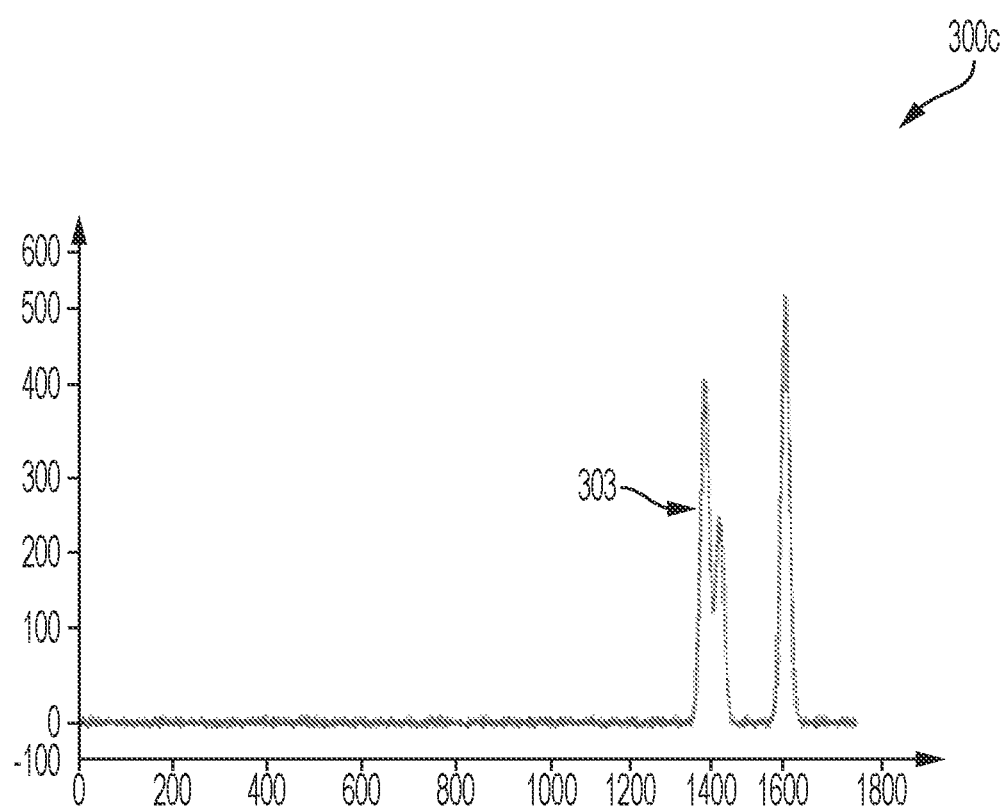

Consider real-time gas chromatography associated with the predetermined configuration data 300a illustrated in FIG. 3a, may be performed. Further, consider the real-time gas chromatogram 300b to be as illustrated in FIG. 3b. For detecting the at least one symptom, the real-time gas chromatogram 300b may be compared with the predetermined configuration data 300a. The variations between the real-time gas chromatogram 300b and the predetermined configuration data 300a may be detected as at least one symptom. For the real-time gas chromatogram 300b, peak 301 and peak 302 may be detected as the at least one symptom. Similarly, consider the real-time gas chromatogram 300b to be as illustrated in FIG. 3c. For detecting the at least one symptom, the real-time gas chromatogram 300c may be compared with the predetermined configuration data 300a. The variations between the real-time gas chromatogram 300c and the predetermined configuration data 300a may be detected as the at least one symptom. For the real-time gas chromatogram 300c, peak 303 may be detected as the at least one symptom.

Figure 4A:
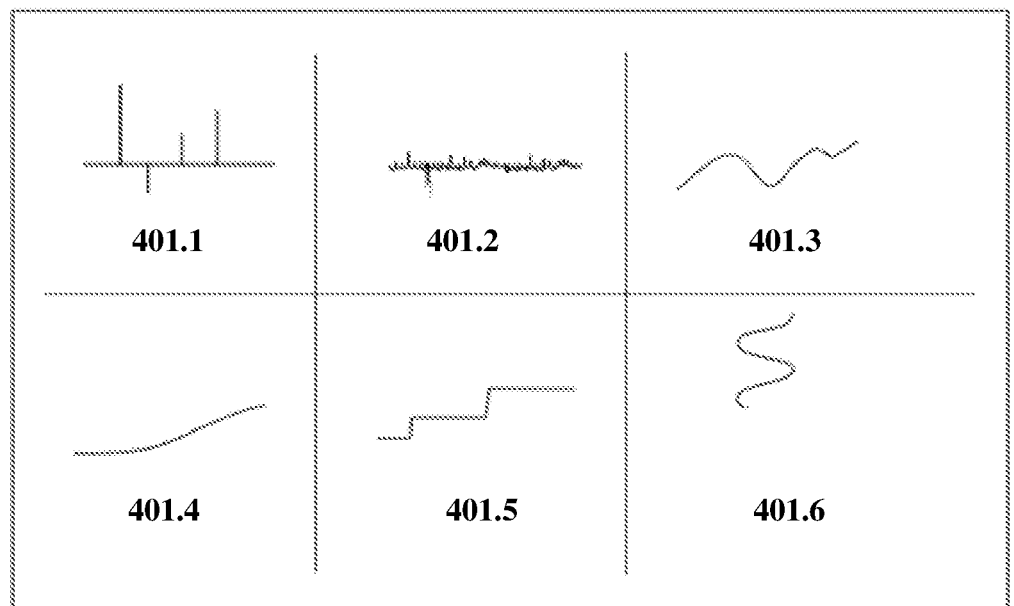
FIGS. 4a and 4b shows exemplary representations of at least one symptom indicating variation in real-time gas chromatogram with respect to predetermined configuration data, in accordance with an embodiment of the present disclosure.
Figure 4B:
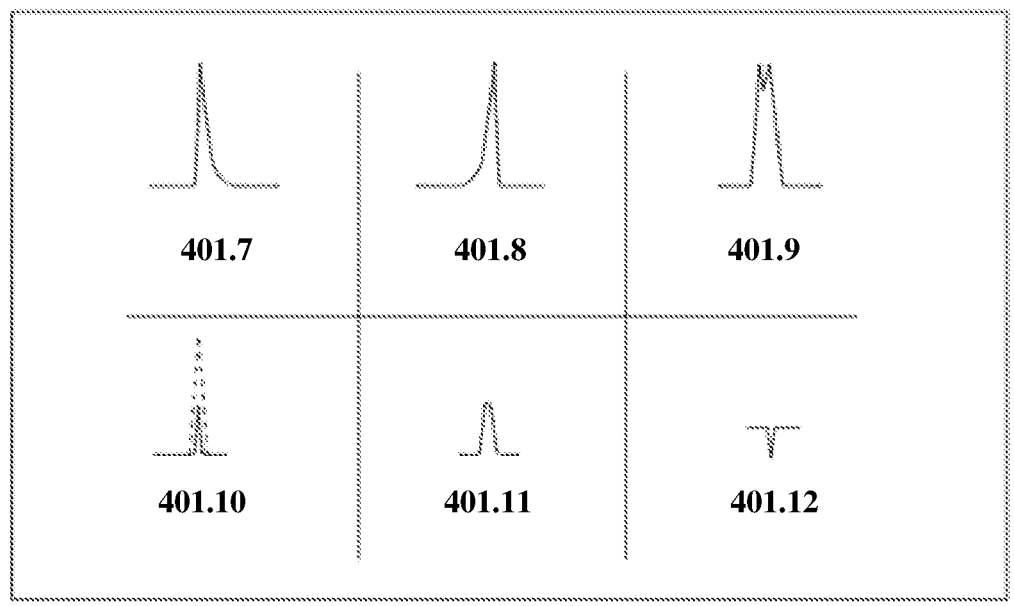

FIGS. 4a and 4b shows exemplary representations of plurality of symptoms indicating variations in the real-time gas chromatogram with respect to the predetermined configuration data. FIG. 4a shows symptoms that may be detected due to the baseline disturbances. Symptom 401.1 may occur due to spiking of the values in the real-time chromatogram. Symptom 401.2 may occur due to addition of noise in the real-time chromatogram. Symptom 401.3 may occur due to wandering of the values in the real-time chromatogram. Symptom 401.4 may occur due to drifting of the values in the real-time chromatogram. Symptom 401.5 may occur due to offset of the values in the real-time chromatogram. Symptom 401.6 may occur due to slipping of the values in the real-time chromatogram. FIG. 4b shows symptoms that may be detected due to the irregularities in the peaks. Symptom 401.7 may occur due to tailing of a peak in the real-time chromatogram. Symptom 401.8 may occur due to fronting of a peak in the real-time chromatogram. Symptom 401.9 may occur due to splitting of a peak in the real-time chromatogram. Symptom 401.10 may occur due to reduction of a peak in the real-time chromatogram. Symptom 401.11 may occur due to rounding of a peak in the real-time chromatogram. Symptom 401.12 may occur due to negation of a peak in the real-time chromatogram. One or more other deviation or abnormalities, known to person skilled in the art, may be inferred as the plurality of symptoms, by the at least one server 111.

Upon detecting the at least one symptom, the at least one server 111 is configured to determine one or more faults from a plurality of faults associated with the GC device 100.

The plurality of faults relating to the GC device 100 may be associated with at least one of the separation column 106, sample, temperature, the detector 107, the sample valve 105, the carrier gas, septum, flow of gaseous mixture, syringe, the GC controller 109, setup of the GC device 100 and so on. The one or more faults may be caused due to one or more factors. The one or more faults may be determined using the at least one real-time symptom and a fault signature data. In an embodiment, the at least one server may be configured to perform mapping of the at least one symptom with the fault signature data. The mapping may be performed by various methods such as one-to-one or many-to-one or many-to-many mapping. In a preferred embodiment, many-to-many mapping may be performed using a machine learning procedure.

Further, the fault signature data may be generated using a machine learning model trained by providing the plurality of faults and the historic gas chromatogram received from the at least one database 110. The fault signature data indicates association of each of the plurality of faults with plurality of symptoms associated with the GC device 100. In an embodiment, the machine learning model may be one of a neural network, a decision tree, market-basket analysis and so on. Using the machine learning model, each of the plurality of symptoms are appended to a causing fault. This may be characterized as signatures of different causal faults. A list of such causal faults with their data signatures is generated from the machine learning model. One or more techniques, known to a person skilled in the art, may be implemented for training the machine learning model.

In an embodiment, various troubleshooting manuals may be used for the gas chromatographs of the GC device 100, for generating relations between different kinds of problems and various symptoms associated with the problems.

In an embodiment, the generated fault signature data may be quantified in a look up table. An exemplary representation of the fault signature data may be as shown in Table 1 below:

TABLE 1

| Part | Noise | Reduction in size of peak | Fronting and Tailing in peaks | Overlap of peaks | Shift in retention time |
|---|---|---|---|---|---|
| Contamination of separation column | 1 | 1 | 1 | 1 | 1 |
| Fluctuation in sample | 0 | 1 | 0 | 0 | 0 |
| Fluctuation in temperature | 0 | 1 | 1 | 1 | 1 |
| Contamination of detector | 1 | 0 | 0 | 0 | 0 |
| Lower flow of gaseous mixture | 0 | 0 | 0 | 0 | 1 |

From Table 1, the plurality of faults related with the GC device 100 may be contamination of the separation column 106, fluctuation in the sample, fluctuation in the temperature, contamination of the detector 107 and lower flow of the gaseous mixture. Consider, Value "1" against a fault and a symptom in the look-up table indicates that said fault is associated with said symptom and value "0" against a fault and a symptom in the look-up table indicates that said fault is not associated with said symptom. Hence, the contamination of the separation column 106 may be determined when the at least one symptom includes noise, reduction in size of peak, fronting and tailing of peaks, overlap of peaks and shift in retention time. The fluctuation in the sample may be determined when the at least one symptom includes reduction in size of peak. The fluctuation in the temperature may be detected when the at least one symptom includes reduction in size of peak, fronting and tailing of peaks, overlap of peaks and shift in retention time. The contamination of the detector 107 may be detected when the at least one symptom includes noise. The lower flow of gaseous mixture may be determined when the at least one symptom includes shift in retention time. Further, a confidence score is determined for each of the one or more determined faults. It is to be noted by a person skilled in the art, that while the table 1 is currently described using binary values (0, 1), the table 1 may include fractions as well.

Consider, the at least one symptom detected by the at least one server 111 to be reduction in size of peak, fronting and tailing of peaks, overlap of peaks and shift in retention time. By mapping the detected at least one symptom with the plurality of faults in the look-up table, the one or more faults may be determined to be the fluctuation in the sample, the fluctuation in the temperature and the lower flow of the gaseous mixture. Similarly, consider the at least one symptom detected by the at least one server 111 to be the noise and the overlap of peaks. By mapping the detected at least one symptom with the plurality of faults in the look-up table, the one or more faults may be determined to be the contamination of the separation column 106, the fluctuation in the temperature and the contamination of the detector 107. When the detected at least one symptom is associated a fault, said fault may be determined to be part of the one or more faults.

In an embodiment, the at least one server 111 may be configured to determine confidence score for each of the one or more determined faults. In an embodiment, the confidence score indicates probability of occurrence of corresponding fault in the GC device 100. In an embodiment, the confidence score may be computed based on associated of at least one detection symptom with the determined one or more faults. From previous example, consider the one or more faults are determined to be the contamination of the separation column 106, the fluctuation in the temperature and the contamination of the detector 107 for the noise and the overlap of peaks as the at least one symptoms. The confidence score associated with each of the one or more faults including the contamination of the separation column 106, the fluctuation in the temperature and the contamination of the detector 107, is determined. The confidence score for the contamination of the separation column 106 may be 20%, the confidence score for the fluctuation in the temperature may be 30% and the confidence score for the contamination of the detector 107 may be 50%. One or more techniques, known to a person skilled in the art, may be implemented for determining the confidence score. In an embodiment, based on the one or more faults and the confidence scores, a manual check or an auto re-calibration can be initiated to the GC device 100.

Figure 5:
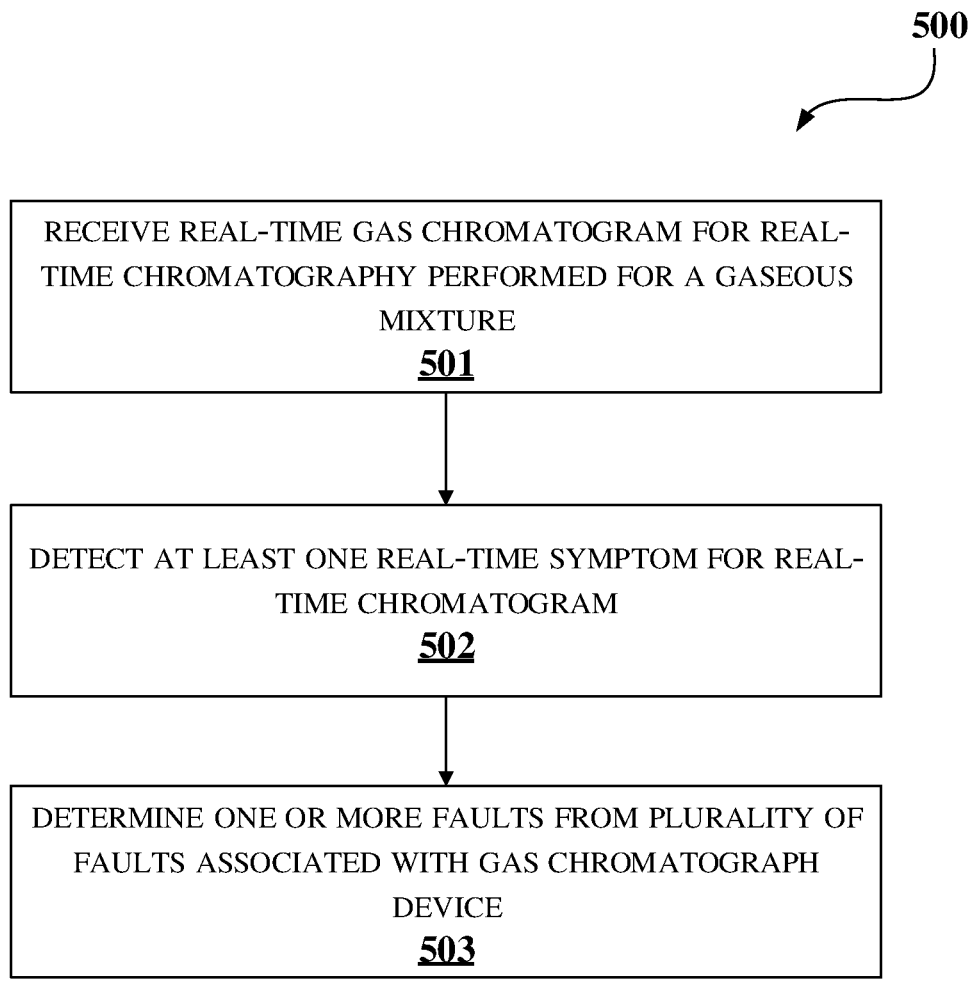
FIG. 5 illustrates a flowchart for detecting faults associated with a GC device in a process plant, in accordance with an embodiment of the present disclosure.

FIG. 5 illustrates a flowchart for detecting faults associated with a GC device 100 in a process plant, in accordance with an embodiment of the present disclosure.

At block 501, the at least one server 111 may be configured to receive the real-time gas chromatogram from the at least one database 110. The real-time gas chromatogram may be obtained by performing the real-time gas chromatography for the gaseous mixture in the GC device 100. The real-time gas chromatogram may be a graph representing value of composition of each of the plurality of compounds in the gaseous mixture against retention time associated with corresponding compound in a predefined sequence.

At block 502, the at least one server 111 may be configured to detect the at least one real-time symptom for the real-time gas chromatogram. The at least one real-time symptom may be detected by comparing the graph with the predetermined configuration data relating to the real-time gas chromatography. The at least one real-time symptom indicates variation in the graph with respect to the predetermined configuration data.

At block 503, the at least one server 111 may be configured to determine the one or more faults from the plurality of faults associated with the GC device 100. The one or more faults may be determined using the at least one real-time symptom and the fault signature data received from the at least one database 110. The fault signature data may be generated using the machine learning model trained by providing the plurality of faults and the historic gas chromatogram.

Embodiments of the present invention provision a systemic evaluation of correctness and confidence in results of the GC device 100. This enables early corrective action aiding in accurate, consistent and reliable GC measurements.

Embodiments of the present invention provisions stronger confidence in output of the GC device 100.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

REFERRAL NUMERALS

| Reference Number | Description |
| --- | --- |
| 100 | GC device |
| 101 | Process line |
| 102 | Probe |
| 103 | Bypass filter |
| 104 | GC oven |
| 105 | Sample valve |
| 106 | Separation column |
| 107 | Detector |
| 108 | Heater system |
| 109 | GC controller |
| 110 | Database |
| 111 | Server |
| 301, 302 and 303 | Real-time symptom |
| 401.1 . . . 401.10 | Plurality of symptoms |

We claim:

1. A method for detecting faults associated with a gas chromatograph device in a process plant, by at least one server operationally coupled with the gas chromatograph device, the process plant including at least one piece of equipment operating with and ejecting a gaseous mixture comprising a plurality of compounds, the gas chromatograph device being coupled with the piece of equipment, wherein the gas chromatograph device is further associated with at least one database configured to store at least one real-time gas chromatogram and at least one historic gas chromatogram obtained from the gas chromatograph device by performing one or more gas chromatography of a gaseous mixture, the method comprising:

receiving a real-time gas chromatogram for a real-time gas chromatography performed for the gaseous mixture, from the at least one database wherein the real-time gas chromatogram is a graph representing values of composition of each of the plurality of compounds against retention time associated with a corresponding compound in a predefined sequence;

detecting at least one real-time symptom for the real-time gas chromatogram using predetermined data relating to the real-time gas chromatography, the predetermined data indicating accurate values of composition of each of the plurality of compounds against the retention time, wherein the at least one real-time symptom indicates variation in the graph with respect to the predetermined data; and determining one or more faults from a plurality of faults associated with the gas chromatograph device using the at least one real-time symptom and a fault signature data, wherein the fault signature data is generated using a machine learning model trained by providing the plurality of faults and historic gas chromatogram received from the at least one database, wherein the historic gas chromatogram is obtained for one or more previous gas chromatography of the gas chromatograph device, wherein the fault signature data indicates association of each of the plurality of faults with a plurality of symptoms.

2. The method as claimed in claim 1, further comprising determining a confidence score for each of the one or more faults, wherein the confidence score indicates probability of occurrence of the corresponding fault in the gas chromatograph device.

3. The method as claimed in claim 1, wherein detecting the at least one real-time symptom comprises:
detecting a plurality of peaks in the graph;
comparing the plurality of peaks with the with the predetermined data to identify at least one of normal peaks from the plurality of peaks and one or more ghost peaks in the graph; and
detecting the at least one real-time symptom associated with peaks other than the normal peaks using one or more image processing techniques.

4. The method as claimed in claim 1, wherein determining the one or more faults comprises mapping the at least one real-time symptom from the plurality of symptoms in the fault signature data with the plurality of faults of the fault signature data, wherein the fault signature data is a look-up table comprising rows and columns as the plurality of faults and the plurality of symptoms.

5. A control system for detecting faults associated with a gas chromatograph device in a process plant, the process plant including at least one piece of equipment operating with and ejecting a gaseous mixture comprising a plurality of compounds, the gas chromatograph device being coupled with the piece of equipment, wherein the control system comprises at least one server and at least one database operationally coupled with the gas chromatograph device wherein the at least one database is configured to store at least one real-time gas chromatogram and at least one historic gas chromatogram obtained from the gas chromatograph device by performing one or more gas chromatography of a gaseous mixture, wherein the at least one server is configured to:

receive a real-time gas chromatogram for a real-time gas chromatography performed for the gaseous mixture, from the at least one database, wherein the real-time gas chromatogram is a graph representing values of composition of each of the plurality of compounds against retention time associated with corresponding compound in a predefined sequence;

detect at least one real-time symptom for the real-time gas chromatogram using predetermined data relating to the real-time gas chromatography, the predetermined data indicating accurate values of composition of each of the plurality of compounds against the retention time, wherein the at least one real-time symptom indicates variation in the graph with respect to the predetermined data; and determine one or more faults from a plurality of faults associated with the gas chromatograph device using the at least one real-time symptom and a fault signature data, wherein the fault signature data is generated using a machine learning model trained by providing the plurality of faults and historic gas chromatogram received from the at least one database wherein the historic gas chromatogram is obtained for one or more previous gas chromatography of the gas chromatograph device, wherein the fault signature data indicates association of each of the plurality of faults with a plurality of symptoms.

6. The control system as claimed in claim 5, wherein the at least one server is further configured to:
determine a confidence score for each of the one or more faults, wherein the confidence score indicates probability of occurrence of the corresponding fault in the gas chromatograph device.

7. The control system as claimed in claim 5, wherein the at least one server detects the at least one real-time symptom by performing the steps of:
detecting plurality of peaks in the graph;
comparing the plurality of peaks with the predetermined data to identify at least one of normal peaks from the plurality of peaks and one or more ghost peaks in the graph; and
detecting the at least one real-time symptom associated with peaks other than the normal peaks using one or more image processing techniques.

8. The control system as claimed in claim 5, wherein the at least one server determines the one or more faults by mapping the at least one real-time symptom from the plurality of symptoms in the fault signature data with the plurality of faults of the fault signature data, wherein the fault signature data is a look-up table comprising rows and columns as the plurality of faults and the plurality of symptoms.

9. The method as claimed in claim 1, wherein the machine learning model includes one of a neural network, a decision tree, or market-basket analysis.

* * * * *